United States Patent
Lee

(10) Patent No.: US 6,869,089 B2
(45) Date of Patent: Mar. 22, 2005

(54) ROLL DECREASING STRUCTURE OF A SUSPENSION FOR THE FRONT AND DEAD AXLES OF A COMMERCIAL VEHICLE

(75) Inventor: Yong-Soo Lee, Chonrabuk-Do (KR)

(73) Assignee: Hyundai Motor Company, Seoul (KR)

( * ) Notice: Subject to any disclaimer, the term of this patent is extended or adjusted under 35 U.S.C. 154(b) by 104 days.

(21) Appl. No.: 10/310,348

(22) Filed: Dec. 4, 2002

(65) Prior Publication Data
US 2003/0111811 A1 Jun. 19, 2003

(30) Foreign Application Priority Data
Dec. 13, 2001 (KR) .......................... 2001-78810

(51) Int. Cl.$^7$ .......................... B60G 3/14; B60G 11/50; B60G 21/055
(52) U.S. Cl. .......................... 280/124.107; 280/124.13; 280/124.165; 280/124.168; 267/190; 267/275
(58) Field of Search .......................... 280/124.107, 124.13, 280/124.165, 124.166, 124.168; 267/190, 275, 285

(56) References Cited

U.S. PATENT DOCUMENTS

| | | | |
|---|---|---|---|
| 2,641,464 A | * | 6/1953 | Linn .................... 280/124.168 |
| 2,659,596 A | * | 11/1953 | Keysor .................. 280/124.13 |
| 2,741,493 A | * | 4/1956 | Matthias .............. 280/124.107 |
| 3,263,984 A | * | 8/1966 | Linn .................... 280/124.168 |
| 3,615,081 A | | 10/1971 | Ravenel |
| 3,652,104 A | | 3/1972 | Chabek |
| 3,778,082 A | | 12/1973 | Grosseau |
| 3,990,725 A | | 11/1976 | Allison |
| 4,033,605 A | | 7/1977 | Smith et al. |
| 4,094,532 A | | 6/1978 | Johnson et al. |
| 4,234,205 A | | 11/1980 | Thiesce |
| 4,334,697 A | | 6/1982 | Deweese |
| 4,521,033 A | | 6/1985 | Lenhard-Backhaus et al. |
| 4,570,968 A | | 2/1986 | Mukai et al. |
| 5,178,406 A | | 1/1993 | Reynolds |
| 5,558,361 A | | 9/1996 | Shin |
| 5,630,609 A | | 5/1997 | Shin |
| 6,135,471 A | | 10/2000 | Urbach |
| 6,520,494 B1 | * | 2/2003 | Andersen et al. ..... 280/124.107 |
| 2002/0024192 A1 | * | 2/2002 | Rasidescu et al. .... 280/124.166 |

FOREIGN PATENT DOCUMENTS

| | | |
|---|---|---|
| EP | 0094373 A2 | 11/1983 |
| EP | 0410675 A1 | 1/1991 |
| EP | 1157863 A2 | 11/2001 |
| JP | 2001047824 A * | 2/2001 ............ B60G/3/14 |

* cited by examiner

*Primary Examiner*—Peter C. English
(74) *Attorney, Agent, or Firm*—Morgan Lewis & Bockius LLP

(57) ABSTRACT

A roll decreasing structure of a suspension for front and dead axles of a commercial vehicle, wherein an axle is inserted into a body of a mounting member mounted at a frame. A base arm mounted with a wheel attached to an external side of the axle via a key, whereby the axle is mounted at the other end with a torsion bar case to which an end of a torsion bar composed of a straight spring steel is mounted by way of serrations.

12 Claims, 4 Drawing Sheets

ROLL DECREASING STRUCTURE OF A SUSPENSION FOR THE FRONT AND DEAD AXLES OF A COMMERCIAL VEHICLE

FIELD OF THE INVENTION

The present invention relates to suspension for the front and dead axles of a commercial vehicle, and more particularly, to a roll decreasing structure adapted with a torsion bar.

BACKGROUND OF THE INVENTION

Generally, suspension for a commercial vehicle utilizes many elements, such as leaf springs, leaf spring-mounted brackets, shackles, u-bolts, and the like. The axles and the leaf springs are typically heavy in weight. Furthermore, this system is a non-independent suspension such that the ride, comfort, and safety of the vehicle are inferior.

Independent suspension systems for the front and dead axles typically include a mounting member mounted at a frame, a base arm rotatably mounted at the mounting member, and a coil spring installed between the base arm and the mounting member. The coil spring is connected to the base arm and the mounting member for generating a torsional reaction force when the base arm is rotated.

The mounting member is formed with a bracket, above, and with an axle at a lateral surface. The bracket is mounted to the frame via bolts and nuts. A boss of the base arm attaches to the axle, while the base arm is formed at the other end with a spindle for mounting the wheels thereto.

The weight of the vehicle is thus supported by the coil spring. The independent suspension system absorbs vibration and shock via the coil spring, thereby, coping with the up and down movement of the vehicular body while the vehicle is in motion.

Furthermore, vehicles are typically equipped with a stabilizer bar which serves to reduce the difference in height among the wheels when the vehicle turns or runs over rough terrain. Therefore, reducing the rolling and improving the stability of the vehicle, and particularly the turning stability.

Typically, a stabilizer bar is bent at both sides to a "U" shape and is formed at both tip ends with flat bolt holes for connecting to brackets. The stabilizer bar is further equipped with a stabilizer rod in order to be secured at a midsection to a vehicular body.

Furthermore, the stabilizer rod is formed with semicircular up/down brackets for fitting to the stabilizer bar and rubber bushes. An upper side of the stabilizer rod, mounted to the frame, is attached with a number of parts such as rubber bushes, washers, and the like. In use, the number of parts is large, resulting in an increase of time and effort in the assembly process. Also, the rubber bushes typically wear out, generating a squeaky-type sound and the formation of cracks at the connecting parts, etc.

In consideration of the above problems, the roll decreasing structure thus described is not appropriate for a suspension for the front and dead axles of a commercial vehicle.

SUMMARY OF THE INVENTION

In an embodiment of the present invention, mounting members attach to a vehicle frame and base arms mount to the wheel units. The free ends of the mounting members and base arms are interconnected by coil springs. The base arms move in relation to the wheels incurring vibration and impact forces. The vibration and impact forces are then transferred to the coil springs; respectively. Thus, repulsive forces are generated within the coil springs from torsion of the coil springs by the movement of the base arms. A torsion bar is also provided to transmit forces generated at one wheel into a mutual turning effect to the axles oppositely positioned at both sides of the vehicular body.

In use, the torsion bar interconnects two axles mounted with the base arms at their respective external sides, where the two axles are rotatably mounted to the mounting members at both sides. As a result, the rotating phase difference of the base arms at both sides are restricted by the torsion bar, thereby reducing the height difference between the two wheels and decreasing rolling of the vehicle body.

Furthermore, the torsion bar according to the present invention is formed in a straight shape, thereby becoming simple in form and mounting structure, and reduced in weight and in the number of parts for easy assembly.

Still another advantage is that the reduced number of parts, reduced cost, and lack of rubber bushings increases the life and durability and decrease maintenance costs.

BRIEF DESCRIPTION OF THE DRAWINGS

The features and advantages of the present invention will be better understood by reference to the following detailed description taken in conjunction with the accompanying drawings in which.

DETAILED DESCRIPTION OF THE INVENTION

Figure 1:
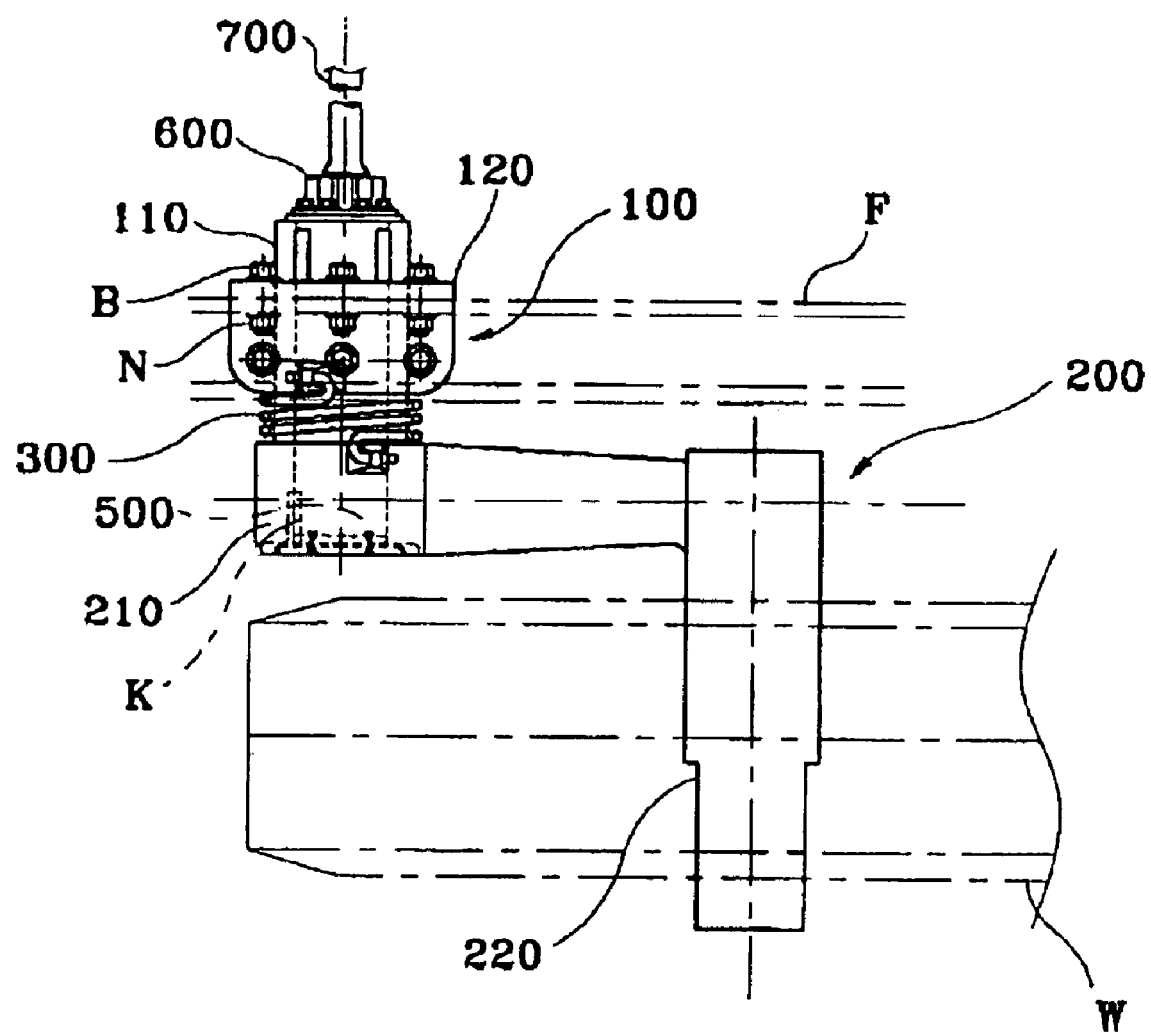
FIG. 1 is a plan view of an independent suspension system of a commercial vehicle according to an embodiment of the present invention.
Figure 2:
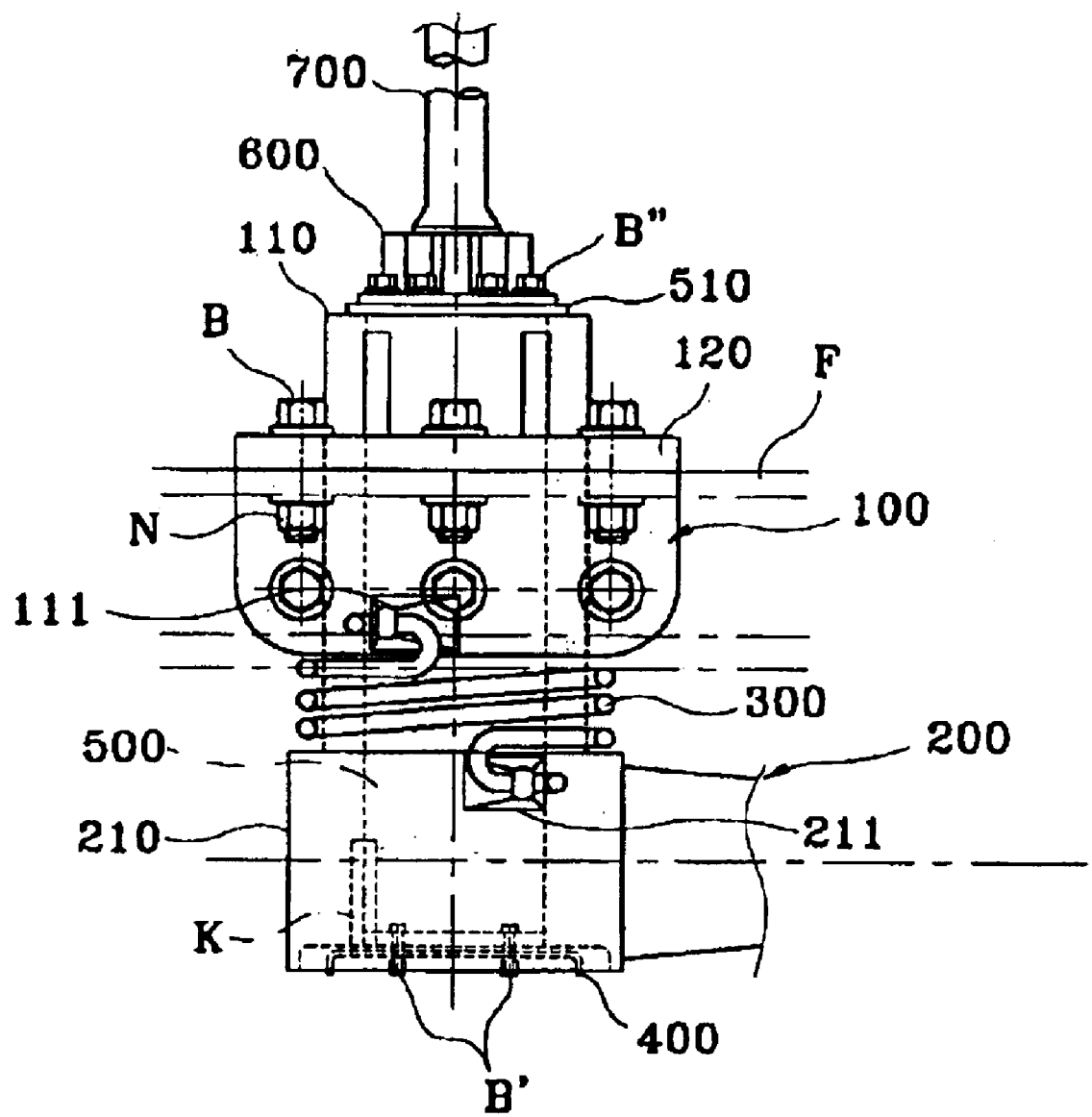
FIG. 2 is an enlarged view of the principal parts of FIG. 1.
Figure 3A:
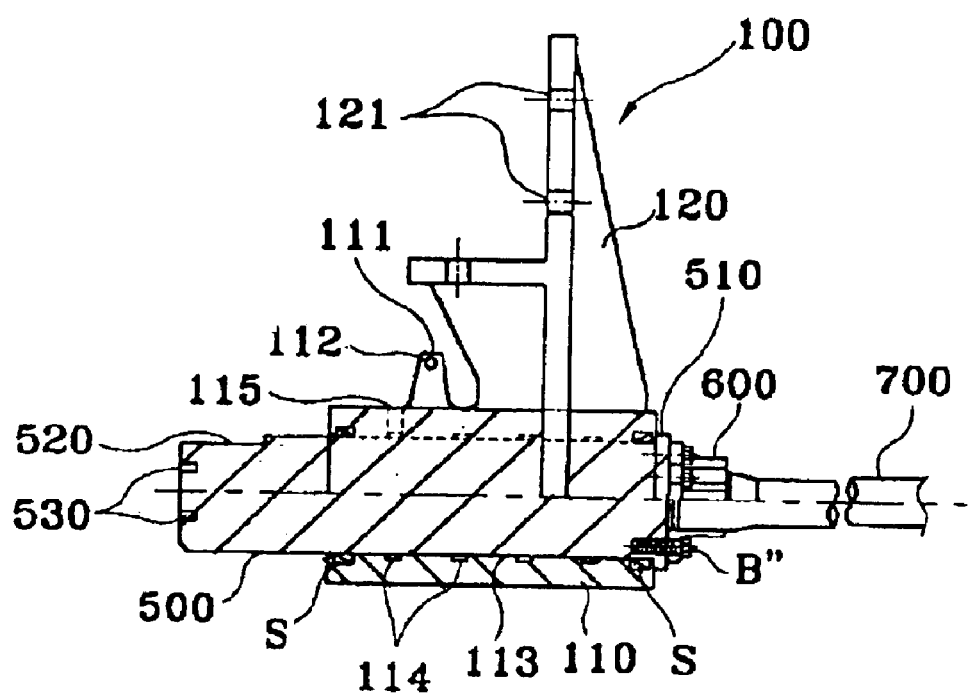
FIG. 3A illustrates a longitudinal sectional view of FIG. 2
Figure 3B:
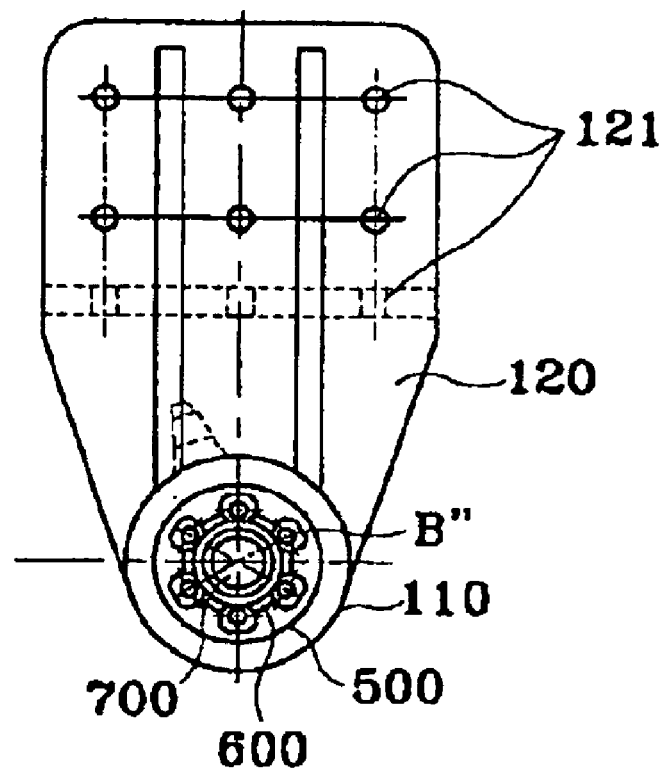
FIG. 3B illustrates a right side view of the same.

As shown in FIGS. 1–3, a mounting member 100 includes a body 110 and a bracket 120 disposed at an upper side of the body 110. The bracket 120 is formed with bolt holes 121. The mounting member 100 is mounted to a frame (F) via bolts (B) and nuts (N) through the bracket 120.

The body 110 of the mounting member 100 is formed with a through hole 113 through which an axle 500 is inserted from the inside of the vehicular body toward the exterior. The body 110 is formed at an inner circumferential surface thereof with a grease passage 114, and a grease inlet hole 115. The grease inlet hole 115 is formed at an appropriate place in the body 110 for grease to be poured into the grease passage 114. Seals (S) are adhered to the axle 500 and installed at both ends of the inner circumferential surface the body 110 for preventing oil from leaking outside.

A hitching jaw or retainer portion 510 is formed at the end of the axle 500, toward the internal side of the vehicle body to prevent the axle 500 from slipping outwardly from the body 110 of the mounting member 100. A key groove 520 is formed at an outer circumferential surface of the axle 500 where the base arm 200 is mounted.

A key groove is also formed at an inner surface of a boss 210 corresponding to the key groove 520 when the boss 210 of the base arm 200 is inserted onto the axle 500. The key groove establishes that the base arm 200 and the axle 500 are integrally rotated when a key (K) is inserted into the key groove. The base arm 200 is formed at the other end thereof with a spindle 220 on which a wheel (W) is mounted.

A coil spring 300 is inserted onto the axle 500 before the boss 210 of the base arm 200 is mounted to the axle 500. Both ends of the coil spring 300 are respectively inserted into round holes 112 of a protrusion 111 (FIG. 3) defined in the body 110 of the mounting member 100 and in the protrusion 211 (FIG. 2) defined in the boss 210 of the base arm 200. Both ends of the coil spring 300 are also bent so that they should not slip out of position.

Once the key (K) is inserted, a cover 400 having a larger diameter than the axle 500 is mounted by bolts (B'), through bolt holes 530, to an external end surface of the axle 500. This prevents the base arm 200 from being separated from the axle 500.

The axle 500 is mounted at an inner end surface thereof with a torsion bar case 600 via bolts (B"). The torsion bar case 600 is cylindrically shaped and formed with a flange. The torsion bar case 600 is coupled with a straight torsion bar 700. In a preferred embodiment the torsion bar 700 is made of spring steel and coupled with the torsion bar case 600 by a serration method, such that circumferential movement is restricted therebetween.

The above-mentioned structure is also applied to a suspension system of a wheel (W) of the opposite side of the vehicle. Therefore, both ends of the torsion bar 700 are mounted, on opposite ends, with axles 500, respectively, inserted into a mounting member 100 at both a left and a right side of the vehicle. Thus, in use, the rotating phase difference of the base arms at both sides of the vehicle are restricted by the torsion bar, thereby reducing the height difference between the two wheels and decreasing rolling of the vehicle body.

Hereinafter, the operation of the present invention will be described.

When the base arm 200 is rotated by the bouncing or movement of the vehicular body, the axle 500 is rotated at the same angle as that of the base arm 200. This transfer in movement between the base arm 200 and the axle 500 is due to the key (K). The amount of rotation is then transmitted through the torsion bar case 600 and to the torsion bar 700.

When the position of the wheels at both sides of the vehicle are changed, the rotating direction and angles of the base arms 200 at both sides of the vehicle also change. However, when the torsion bar 700, interconnecting two axles 500 on both sides of a vehicle restrict the axles 500 from moving, the angle difference between the base arms 200 at both sides of the vehicle is reduced. Thereby, the relative position difference between the two wheels is decreased. As a result, the rolling of a vehicle can be restricted to thereby provide stability to a vehicle in motion.

The torsion bar 700 can be twisted within the scope of spring resilience to allow wheels at both sides to move independently as much as the amount of the twist, such that the suspension system does not lose the characteristic of an independent suspension.

As apparent from the foregoing, there is an advantage in the roll decreasing structure of a suspension for the front and dead axles of a commercial vehicle. Thus, an appropriate amount of roll decreasing can be achieved in the suspension of the front and dead axles of a commercial vehicle utilizing the torsional reaction force of a spring. As a result, the rotating stability of a vehicle can be enhanced to decrease the instability felt by a driver relative to the rolling of a vehicle that occurs when the vehicle is in motion.

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

What is claimed is:

1. A roll decreasing structure of a suspension, comprising:
   a mounting member configured to be coupled to a frame;
   a first base arm coupled with a wheel and interconnected to said mounting member by a coil spring wherein vibration and impact are absorbed by repulsive force in response to torsion of said coil spring in relation to rotation of said base arm; and
   a straight torsion bar configured to interconnect a first axle mounted with said first base arm with a second axle mounted at a second base arm for transmitting a mutual turning effect;
   wherein said mounting member includes a body defining a hole therethrough into which the first axle is correspondingly inserted, wherein said first base arm is fixed toward an external end of the first axle, and a torsion bar case is mounted toward an inner end of said first axle, wherein said torsion bar case is coupled to an end of the torsion bar by way of serrations, said torsion bar being configured of spring steel.

2. The structure as defined in claim 1, wherein the inner end of said first axle is formed with a hitching jaw.

3. The structure as defined in claim 1, wherein said first axle and a boss of said first base arm coupled near an outer end of said first axle are coupled by a key.

4. The structure as defined in claim 1, further comprising a cover having a larger diameter than the first axle, said cover being coupled by a fastening means toward an external end surface of said first axle.

5. The structure as defined in claim 1, wherein the body is formed at an inner side thereof with a grease passage, a grease hole is formed in the body for grease to be poured into the grease passage, and a seal engaging the axle is installed at an inner side of the body.

6. A roll decreasing structure of a commercial vehicle, comprising:
   a torsion bar configured with a first straight end and a second straight end;
   a torsion bar case configured to couple either said first straight end or said second straight end of said torsion bar with an inner end of an axle;
   at least one base arm having a first end configured and dimensioned to couple to a wheel and a boss coupled between a second end of said base arm and an external end of said axle by a key; and
   at least one mounting member defining a hole therethrough configured to receive said axle and couple toward said external end thereof, and wherein said mounting member has a first end configured to couple with a vehicle and a second end configured to couple with said base arm.

7. The roll decreasing structure of claim 6, wherein said axle is a dead axle of a commercial vehicle.

8. The roll decreasing structure of claim 6, wherein said axle is a front axle of a commercial vehicle.

9. The roll decreasing structure of claim 6, wherein said axle has an inner end formed with a hitching jaw.

10. The roll decreasing structure of claim 6, further comprising a cover having a larger diameter than said external end of said axle and configured to receive said external end of said axle.

11. The roll decreasing structure of claim 6, wherein said mounting member is configured to receive seals associated with said axle where said axle passes through said hole in said mounting member, and wherein said mounting member has a grease hole providing access to a grease passage.

12. The roll decreasing structure of claim 6, further comprising a coil spring coupled between said second end of said mounting member and said boss.

* * * * *